United States Patent [19]
Gardiner et al.

[11] 3,952,627
[45] Apr. 27, 1976

[54] SLOT FORMER ASSEMBLY FOR USE IN SOLID PROPELLANT ROCKET MOTORS

[75] Inventors: Franklyn A. Gardiner; Oscar M. Hawkins; Garland K. Grace, all of Huntsville, Ala.

[73] Assignee: Thiokol Corporation, Newtown, Pa.

[22] Filed: Aug. 27, 1962

[21] Appl. No.: 219,569

[52] U.S. Cl. ............................. 86/1 R; 264/3 R
[51] Int. Cl.² ........................................ C06B 21/00
[58] Field of Search ............ 86/1; 102/98; 18/45 M; 25/128.1, 34, 44, 128 D; 22/165, 200; 264/313.3

[56] References Cited
UNITED STATES PATENTS

| | | | |
|---|---|---|---|
| 2,164,310 | 10/1952 | James | 25/128 D |
| 2,847,708 | 8/1958 | Hamjian | 18/34 M |
| 2,920,443 | 1/1960 | Higginson | 102/98 X |
| 2,952,876 | 9/1960 | Miles | 102/98 |
| 3,009,385 | 11/1961 | Burnside | 86/1 |
| 3,052,945 | 9/1962 | Cummings | 25/128.1 |
| 3,064,423 | 11/1962 | Frey | 102/98 |
| 3,120,028 | 2/1964 | Streeter et al. | 86/1 |
| 3,136,831 | 6/1964 | Zinn | 22/165 |

*Primary Examiner*—Verlin R. Pendegrass
*Assistant Examiner*—Harold Tudor
*Attorney, Agent, or Firm*—Stanley A. Marcus; William R. Wright, Jr.

EXEMPLARY CLAIM

1. A slot former assembly for use in fabricating the solid propellant in a motor case for a solid propellant rocket motor comprising an outer hollow core, an inner tubular core and a flexible slot former comprising a skeleton frame consisting of stiffening rods that are retained in spaced relation to each other by means of a cord woven thereon in a basket weave and provided with a covering of flexible material operatively connected to said hollow core, whereby when said assembly is positioned in said motor case and the solid propellant is cast therein about said assembly, a slotted cavity configuration will be provided in the solid propellant in said motor case.

3 Claims, 5 Drawing Figures

FRANKLYN A. GARDINER
OSCAR M. HAWKINS      INVENTORS
GARLAND K. GRACE

FRANKLYN A. GARDINER
OSCAR M. HAWKINS  INVENTORS
GARLAND K. GRACE

FRANKLYN A. GARDINER
OSCAR M. HAWKINS
GARLAND K. GRACE
INVENTORS

BY

ATTORNEY

SLOT FORMER ASSEMBLY FOR USE IN SOLID PROPELLANT ROCKET MOTORS

This invention relates to a slot former assembly for use in fabricating solid propellant rocket motors and more particularly to an assembly for providing in a solid propellant having a cylindrical cavity therein, a cylindrical slot that is in communication therewith, so that the operation of a rocket motor at low teperatures is facilitated.

At the present time it is the custom to form a central cavity in the solid propellant for a solid propellant rocket motor for the purpose of programming the pressure development of the solid propellant rocket motor during the combustion of the solid propellant therein and the operation thereof. However, the use of only a central cavity has some drawbacks, especially where the temperature ratings of the physical properties of the solid propellant are insufficient to properly indicate the ability of the solid propellant to withstand the strains imposed thereon as a result of motor firing and temperature conditioning. In order, therefore, to provide a solid propellant configuration with lesser induced strains which will reduce the level of physical property requirements in the solid propellant to permit it to be satisfactorily fired at low temperature conditions, it was deemed advisable to provide, in the solid propellant, in addition to the central cylindrical cavity therein, a transversely positioned circular slot that is in communication with the central cavity and will serve essentially as an expansion area in the solid propellant.

It is, therefore, an object of this invention to provide an assembly which will form, in the solid propellant, a central cavity of cylindrical configuration having a transverse circular slot in communication therewith.

In view of the fact that, once the circular slot has been formed, there would be difficulty in withdrawing the slot former from the rocket motor after the solid propellant has been cured some means of extraction of the slot former without damaging the configuration of the central cavity and the slot in the solid propellant had to be achieved.

It is another object of this invention, therefore, to provide a slot former assembly that is susceptible of being dissimulated and withdrawn from the solid propellant without damage to the configuration of the central cavity or the slot in the solid propellant It is still another object of this invention to provide a slot former that is molded from a semi-flexible material that will permit the slot former to be positioned in a rocket motor casing through an opening that is of less overall area than the overall area covered by the slot former.

It is a further object of this invention to provide a slot former that is composed of a plurality of stiffening rods having a puller-rope woven thereon in a basket weave to provide a skeleton framework which is placed in a mold so that a material that will be flexible between temperatures ranging from 50°to 250° F can be molded onto the skeleton framework to form a homogeneous assembly that is susceptible of being dissimulated.

It is a still further object of this invention to provide a slot former assembly that is simple to fabricate, flexible for insertion into a motor case, and easy to remove from the cavity configuration after the solid propellant has been properly cured.

With the above and other objects and advantages in view, the invention consists of the minor details of construction and combination of parts more fully hereinafter described, claimed and illustrated in the accompanying drawings in which:

Referring more in detail to the drawings, wherein like parts are properly designated by like reference numerals, the reference numeral (10) is used to designate a slot former of a slot former assembly embodying the invention.

The slot former (10) which may be of a truncated conical-shaped formation, as shown, comprises a skeleton or framework (11) which consists of a plurality of equally spaced, radially disposed tie-rods (12) and stiffening rods (13) that may be made from metal or any other suitable material.

Figure 1:
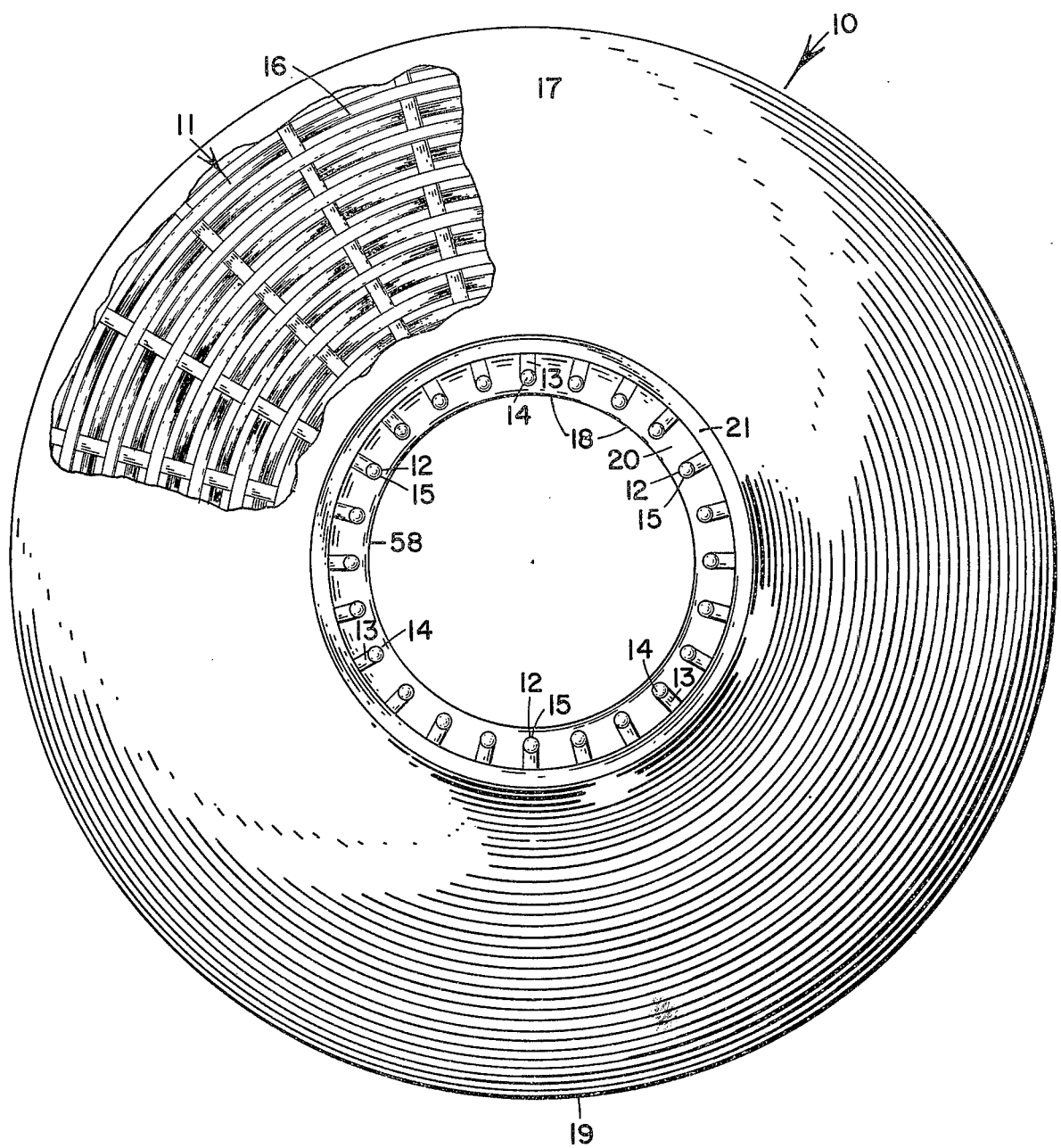
FIG. 1 is a top plan view, partly broken away, of a slot former of an embodiment of the present invention.

Stiffening rods (13) have angularly disposed pointed ends (14), while tie-rods (12) have angularly disposed ends that are longer than the ends (14) of the rods (13) and have a threaded portion (15) thereon. A pull cord or rope (16) of a suitable size and material is woven on the rods (12) and (13) in a basket weave to complete the skelton or framework (11) as shown in FIG. 1. The skeleton or framework (11) is then placed in a suitable mold and a material such as silicone rubber or any other material that will remain flexible between a temperature range varying from 50°to 250°F is then injected into the mold. The silicone is in a premixed liquid state and forms with the skeleton or frame work (11) a homogeneous casting therebetween.

The size of the slot former (10) and the configuration thereof depending on the configuration of the desired cavity in the solid propellant being cast. Instead of preparing the slot former (10) in a mold the material used may be brushed or sprayed onto the skeleton or frame work (11). Since there is nno requirement for a smooth outer surface and no requirement for rigid dimensional control of the final shape as would be obtained by the use of a mold, thus both of the preceding operations could be used to carry out the objects of the invention.

The slot former (10), when completed as previously set forth, comprises a truncated conical-shaped body (17) that on the inner surface thereof tapers downwardly circumferentially from a central opening (18) to the peripheral edge (19). An annular flange (20) extends outwardly from the opening (18), and the ends (14) and (15) of the rods (12) and (13) are seated on the flange (20) and extend upwardly from the flange (20) in spaced parallel relation to each other. An annular vertically disposed rim (21) is formed in the body (17) in circumjacent relation to the flange (20) and for the sake of rigidity the height of the rim (21) is less than the height of the ends (14) and (15) of the rods

(12) and (13) as they extend upwardly from the flange (20). The upper surface of the body (17) conversely tapers upwardly from the peripheral edge (19) thereof in parallel relation to the under surface to blend into the rim as shown in FIG. 1.

The slot former assembly comprises a hollow cylindrical outer core (22), a core adapter assembly (23) and an inner tubular core (24).

The outer core (22) comprises an outer tubular member (25) and an inner tubular member (26) which are secured at one of their ends to a ring member (27). Ring member (27) has four radially disposed support ears (28) and an annular rib (29) on the under surface thereof which is interposed between the aforementioned ends of the tubular members (25) and (26) to retain the same in spaced parallel relation to each other. Ring member (27) may be rigidly secured to the aforementioned ends of the tubular members (25) and (26) in any well known manner, such as by welding or the like. An opening (30) extends through the ring member (27) and rib (29) and is in communication with the space intermediate of the tubular members (25) and (26) and each of the ears (28) is provided with an internally threaded bore (31). Rigidly secured as by welding or the like to the outer surface of the outer tubular member (25) in alignment with and inwardly of the ears (28) are four radially disposed guide ears (32) and secured to the opposite ends of the tubular members (25) and (26) is an adapter receiving ring (33). Ring (33) also has an annular rib (34) on one surface thereof that is interposed between the opposite ends of the tubular members (25) and (26) to also aid in retaining the same in spaced parallel relation to each other. Ring member (33) may also be rigidly secured to the opposite ends of the tubular members (25) and (26) in any well known manner, such as by welding or the like. An opening (35) extends through the ring (33) and also communicates with the space intermediate the tubular members (25) and (26) in alignment with the opening (30). The ring (33) has an annular depending skirt portion (36) integral therewith and forming a continuation of the outer surface thereof and the inner surface thereof has provided therein in inverted relation to the skirt portion (36) an annular recess (37).

Ring (33) is positioned in engagement with one end of the core adapter assembly (23), which is provided with an annular recess (38) to receive the skirt portion (36) of the ring (33) and an annular projection or flange (39) that extends into and conforms to the annular recess (37) in the ring (33). The annular recess (38) in the core adapter assembly (23) provides a shoulder (40) on which is positioned in contact therewith a gasket (41) which may be made of teflon or some similar material. The annular recess (38) has a wall (42) in which are provided a pair of spaced annular recesses (43) and (44) and a O-ring (45) is positioned in each of the recesses (43) and (44) in egagement with the inner surface of the skirt portion (36) of the ring (33). Projection or flange (39) also has an annular recess (46) on the inner surface thereof in which is positioned an O-ring (47). The edges of the ring (33) and core adapter assembly (23) are in complimentary contactual engagement with each other with the inner and outer surfaces thereof being flush and forming thereby unbroken smooth inner and outer surfaces.

The opposite end of the core adapter assembly (23) is provided with an annular approximately L-shaped cavity or recessed groove (48) in which is positioned an annular approxmately L-shaped insert (49) which may also be made of teflon or similar material. A plurality of internally threaded bores (50) extend transversely of the core adapter assembly (23). Each of the bores (50) are in communication with the annular recessed groove (48) and each receives a set screw (51) which engages the annular insert (49) in the complimenting shaped cavity or recessed groove (48) to retain the annular insert (49) therein. The core adapter assembly (23) is positioned in engagement with the slot former (10), the upper peripheral edge of the rim (21) is received in a complimentary shaped annular recess (52) in the opposite end of the core adapter assembly (23), and the convex edge (58) of the flange (20) defining the opening (18) is received in the concave groove (59) in the lower end of that portion of the core adapter assembly (23) defining one wall of the recessed groove (48).

Figure 4:
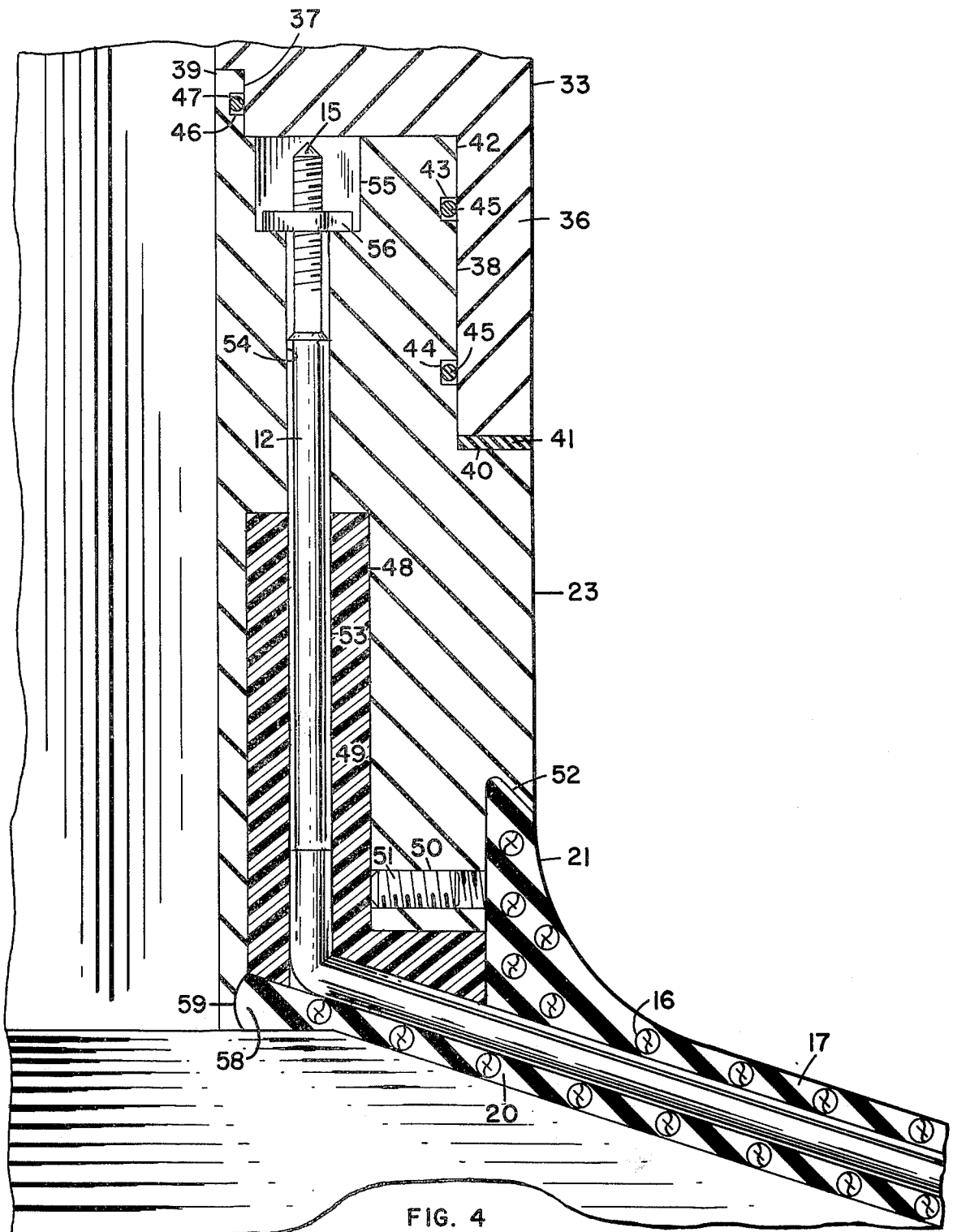
FIG. 4 is an enlarged partial sectional view of the slot former of FIG. 1 showing one of the tie-rods and the core adapter assembly of the slot former assembly.
Figure 5:
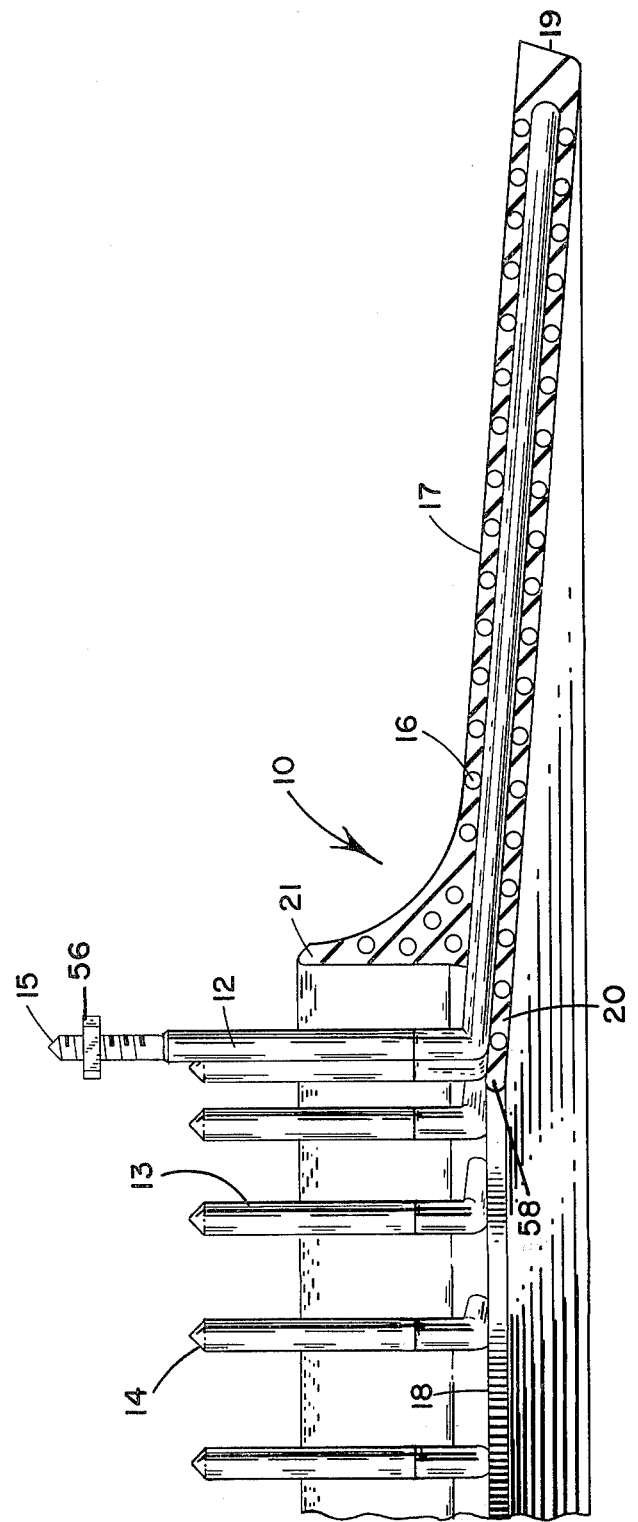
FIG. 5 is an enlarged partial sectional view of the slot former of FIG. 1 showing the manner in which the stiffening and tie-rods are molded into the slot former.

In FIG. 4 it will be noted that the annular insert (49) is provided with a bore (53) through which a tie-rod (12) will extend, and there is a bore (53) for each of the tie-rods (12). The core adapter assembly (23) is provided with bores (54) each of which communicates with and is in alingment with a bore (53) in the annular insert (49), and there is a communicating bore (54) for each of the bores (53). The tie-rods (12) thus extend through the respective bores (53) and (54) with the threaded end (15) of each of the tie-rods (12) terminating in a cavity or socket (55) in the core adapter assembly (23). A nut (56) is threaded onto each of the threaded ends (15) of the tie-rods (12) to removably connect the core adapter assembly (23) to the slot former (10).

Figure 2:
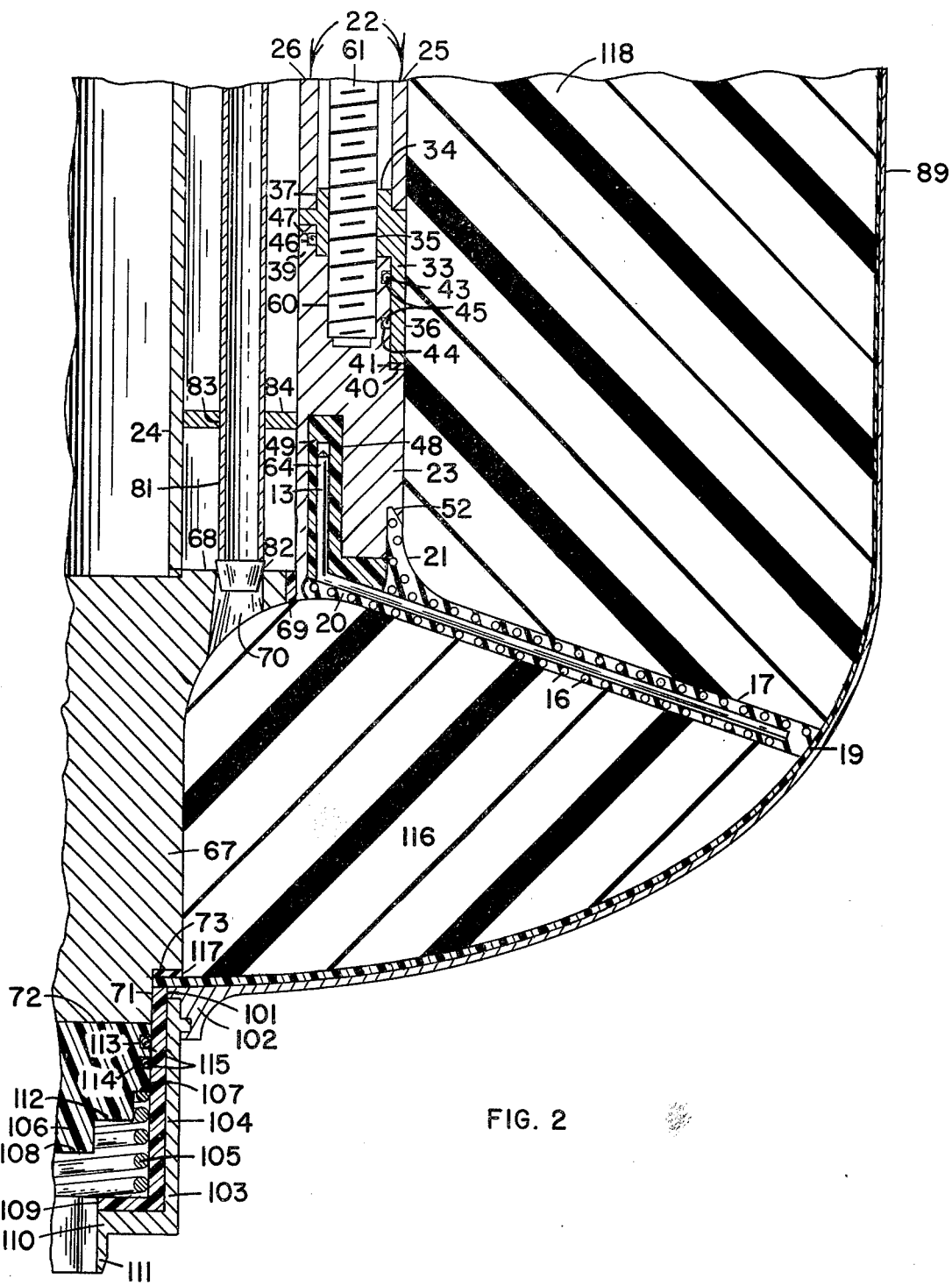
FIG. 2 is a partial sectional view of the lower portion of a rocket motor with a slot former assembly, embodying the invention positioned therein.

In FIG. 2 it is also shown that the core adapter assembly (23) has a plurality of internally threaded bores (60) therein. The bores (60) are in alignment with the opening (35) in the ring (33) and the opening (30) in the ring member (27) so that when an elongated hex head bolt (61) is inserted into the opening (30) in the ring member (27) it will extend into and be engaged at its terminal end with the bore (60) in the core adapter assembly (23). This arrangement permits the outer core (22) to be secured to the core adapter assembly (23) so that they are handled as a unit, as will be later described.

The annular insert (49) of the core adapter assembly is also provided with a plurality of sockets (64) and there is a socket (64) for each of the ends (14) of the stiffening rods (13) as shown in FIG. 2. In this instance, however, the sockets (64) do not have communicating bores (54) because the ends (14) of the stiffening rods (13) do not function as do the ends (15) of the tie-rods (12).

Figure 3:
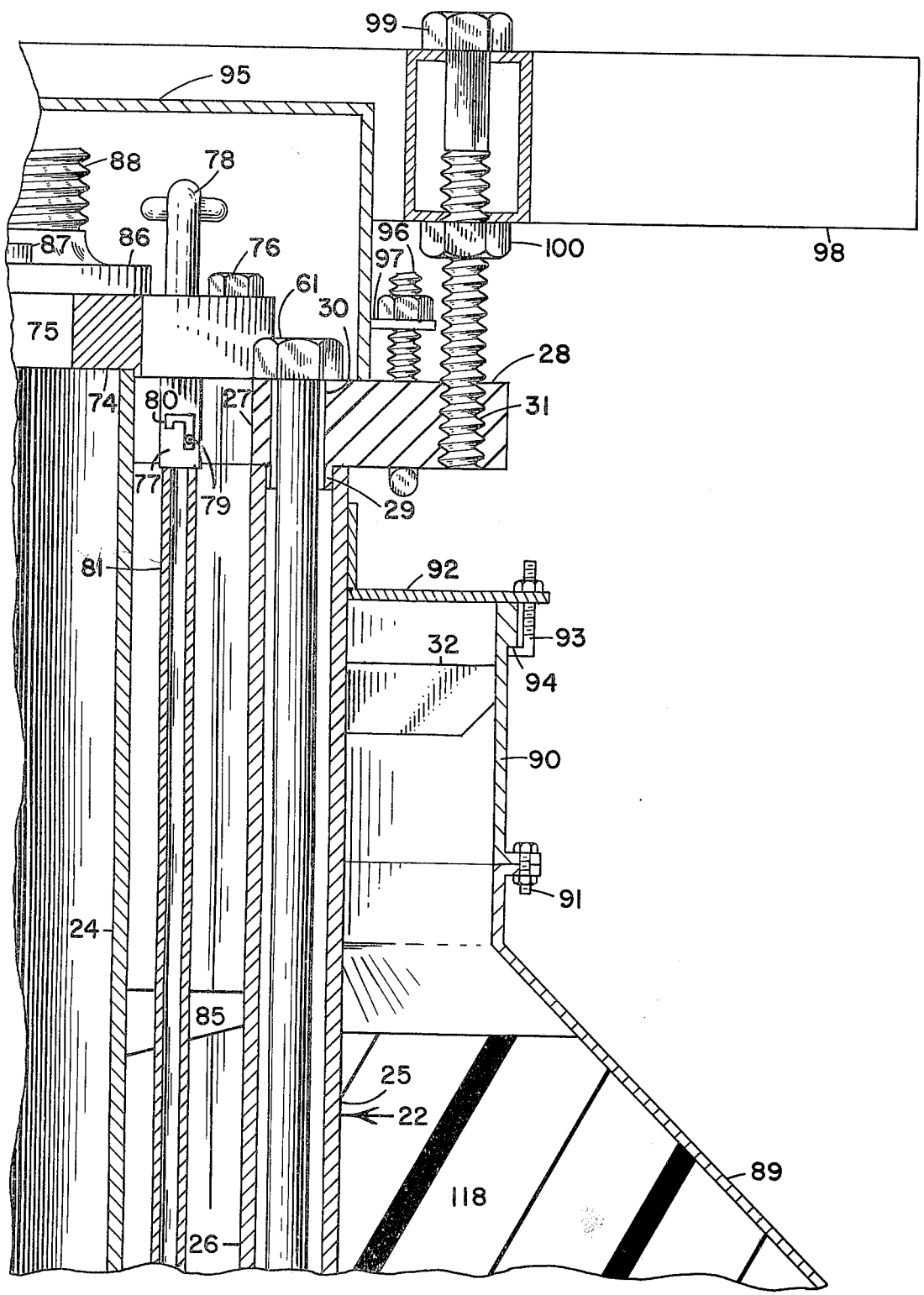
FIG. 3 is a partial sectional view of the upper portion of a rocket motor with the remainder of the slot former assembly of FIG. 2 positioned therein.

To complete the slot former assembly the tubular inner core (24) is positioned within the outer core (22) as shown in FIGS. 2 and 3. To one end of the core (24) there is secured by welding or the like a head end plug (67). The plug (67) includes an annular flange (68) at that end secured to the core (24) and the periphery of the flange (68) is of a size to loosely fit into the core (24). The loose fit of the flange (68) permits a teflon gasket (69) to be secured to the peripheral edge of the flange (68) so that the same may slidably fit into and engage the inner surface of the tubular member (26) and the core adapter assembly (23). The use of the gasket (69) is a safety feature since it prevents metal to metal contact and possible igniting of the solid propellant where the propellant is in contact simultaneously with the plug (67) and the core adapter assembly (23).

While the axis of the flange (68) is at right angles to the longitudinal axis of the core (24), the flange (68) at its convergence with the core (24) is blended into the core (24) with a curve equal to a quarter of a circle. Thus, any of the solid propellant that comes into contact with the plug (67) is devoid of any sharp corners that may tend to crack or break off when the slot former assembly is removed from the motor casing. A plurality of radially disposed inverted substantially conical shaped outlets (70) are provided in the flange (68) for a purpose to be later described. The opposite end of the plug (67) has an annular recess (71) therein which provides a reduced stub or guide portion (72) and a shoulder (73) that is in circumjacent relation to the stub or guide portion (72).

The opposite end of the core (24) is seated in a socket (74) in a cruxiform locating plate (75) which is then rigidly secured to the core (24) by welding or the like. Plate (75) is secured to the plate member (27) by a plurality of hex head bolts (76) and a plurality of guide sleeves (77) are secured to the undersurface of the plate (75) by welding or the like. A plurality of handles (78) extend through the plate (75) so that a handle (78) will terminate within each of the sleeves (77). Each of the handles (78) has a transversely disposed pin (79) the ends of which engage in oppositely disposed inverted L-shaped bayonet slots (80) in each of the sleeves (77). A coil spring not shown is positioned on each of the handles (78) intermediate of the plate (75) and the pin (79) and the springs individually urge the handles toward the plug (67). This action is created because a tubular rod (81) secured to each of the handles (78) are urged toward the plug (67) so that a rubber stopper (82) secured to the free end of each of the rods (81) in any well known manner is urged into the outlets (70), as shown in FIG. 2. Adjacent the stopper (82) the rods (81) extend through openings (83) in horizontally radially extending disposed rod guide ears (84) that are secured as by welding to the core (24). Vertically disposed radially extending core guide ears (85) are secured as by welding to the core (24) intermediate of the terminus of the sleeves (77) and the ears (84) and the ears (85) are of a size to slidably engage the surface of the tubular member (26). The ears (84) and (85) evenly space the core (24) from the inner tubular member (26) as the core (24) is inserted into the tubular member (26) and the stoppers are thus properly aligned with the outlets (70). With the core (24) in position, the outlets (70) communicate with the cylindrical space intermediate of the core (24) and tubular member (26).

A circular plate (86) is secured to the plate (75) by bolts (87) and a centrally located externally threaded stud (88) that is formed integrally with the plate (86) is engaged by a lifting mechanism not shown, whereby the slot former assembly is lowered into or removed from a motor casing.

In order to illustrate the manner of use of the slot former assembly a partial showing of a rocket motor casing (89) appears in FIGS. 2 and 3. FIG. 3 shows the aft end of the motor casing (89) and the manner in which the slot former assembly is supported therein.

A circular casting sleeve (90) is secured by bolts (91) to the motor casing (89) and as the slot former assembly is lowered into the motor casing (89) the terminal ends of the guide ears (32) engage the inner surface of the sleeve (90).

A hollow support member (98) of any conventional structure carries a plurality of bolts (99) which engage the bores (31) in the ears (28) to retain the member (98) in fixed relation to the ring member (27). A lock nut (100) on each of the bolts (99) prevent loosening of the bolts (99).

The head end of the motor casing (89) is provided with an opening (101) and an annular flange (102) on the motor casing (89) is in circumjacent relation to the opening (101). An outer closure cap (103) is connected to and supported by the flange (102) and an inner closure cap (104) is positioned in the cap (103) in contactual relation thereto. A coil spring (105) is positioned in the cap (104) and a plug (106) is positioned in the cap (104). The plug (106) has a seat (107) for one end of the spring (105) and a projection (108) that enters the aligned openings (109) and (110) in the caps (103) and (104). A flange or collar (111) on the motor casing (89) in circumjacent relation to the opening (110) protects the projection (108) as it extends through the openings (109) and (110). The plug (106) is provided with a shoulder (112) that engages the cap (104) about the opening (109) and a pair of annular recesses (113) and (114) in the surface of the plug (106) provide seats for O-rings (115).

In the use of the slot former assembly the rocket motor casing (89) is mounted in a vertical position by any well known means.

The slot former (10) is then connected to the core adapter assembly (23) as previously described, and the nuts (56) are engaged with the ends (15) of the tie-rods (12). The fore end of the outer core (22) is then engaged with the core adapter assembly (23) and the bolts (61) are then inserted through the openings (30) and engaged with the threaded bores (60). In this manner the assembly as a unit is lowered into the motor casing (89). The bolts (93) are tightened and the support member (98) is connected by bolts (99) to the ring member (27).

The peripheral edge (19) of the slot former is in engagement with the inner surface of the motor case (89) and there is a cavity intermediate of the slot former (10) and the head end of the motor casing (89). A charge (116) of propellant is then cast into the cavity in the head end of the motor casing (89) through the core (22). The inner core (24) is then lowered into the motor casing (89). The handles (78) have been previously raised so that the stoppers (82) will not engage the outlets (70) and a gasket (117) of teflon has been bonded to the shoulder (73). The inner core (24) is then forced by hydraulic pressure or by the gravity weight of the core and its associated parts against the charge (116) until the plug (67) is in position as in FIG. 2. Any excess of the charge (116) will be forced out of the cavity through the outlet (70) and a proper formation of the charge (116) will result. When all excess propellant has been removed from the cavity the handles are lowered so that the stoppers (82) close the outlets (70). The remainder of the motor case (89) is then filled with a propellant charge (118).

After the propellant charge (118) has been cast, that is, after the motor case (89) has been filled, a split or sectional L-shaped closure plate (92) is positioned around the outer core (22) and the plate (92) rests on and engages the peripheral edge of the sleeve (90). Hook bolts (93) carried by the plate (92) engage under the annular projection (94) on the sleeve (90) and retain the plate (92) in fixed relation thereto. A circular closure cap (95) is then positioned over the aft end of the slot former assembly and hook bolts (96) carried by apertured support ears (97) that are secured to the cap closure (95) engage under the ears (28) to retain the cap closure (95) in position. The closure plate (92) and closure cap (95) are used to prevent contamination of the propellant charges. The rocket motor casing is then stored to permit the propellant charges to cure. After the propellant charges have been cured the slot former assembly can be removed.

Since it is contemplated to produce motor cases of various sizes, the length of the core (22) which will form a central cavity of suitable configuration, and the size of the core (22) will be determined by the size of the motor casing to be used and the amount of the solid propellant that is being cast.

Also, in order that the removal of the slot former assembly does not damage the configuration of the central cavity in the propellant charge (118), it is desirable that the propellant will not bond or adhere to the surface of the slot former (10). If there is a possibility that such bonding would occur, the slot former (10) can be covered with some material that will serve as a mold release. The material used for the slot former (10) must also have a low tear resistance so that as the pull cord (16) is removed it will tear the material that has adhered thereto and thus remove the slot former (10).

After the propellant charges (116) and (118) have been properly cured, the inner core (24), the outer core (22) and the core adapter assembly (23) connected thereto are removed simultaneously. The teflon nuts (56) will be sheared from the ends (15) of the tie-rods (12) leaving the slot former (10) in the motor casing (89). With the core adapter assembly (23) removed, the pointed ends (14) of the rods (13) and the ends (15) of the tie-rods (12) will be exposed so that each rod may be extracted one by one from the slot former (10) by grasping separately with a suitable removing implement each of the ends of the rods (12) and (13). By prelocating the free end of the pull cord (16), the same may be pulled to dissimulate the slot former (10) and completely remove it from the motor case (89). Upon complete removal of the slot former assembly, a cavity and communicating slot of the desired configuration has been formed in the solid propellant in the motor case (89).

There has thus been provided a slot former assembly which by its inherent structure is capable of carrying out the objects previously set forth; and it is believed that from the foregoing description, the manner of construction and operation of the sot former assembly will be apparent to those skilled in the art. It is also to be understood that changes in the minor details of construction, arrangement, and combination of parts may be resorted to provided they fall within the spirit of the invention and the scope of the appended claims.

Having thus described the invention, what is claimed as new and desired to be secured by letters patent is:

1. A slot former assembly for use in fabricating the solid propellant in a motor case for a solid propellant rocket motor comprising an outer hollow core, an inner tubular core and a flexible slot former comprising a skeleton frame consisting of stiffening rods that are retained in spaced relation to each other by means of a cord woven thereon in a basket weave and provided with a covering of flexible material operatively connected to said hollow core, whereby when said assembly is positioned in said motor case and the solid propellant is cast therein about said assembly, a slotted cavity configuration will be provided in the solid propellant in said motor case.

2. A slot former assembly for providing a slot in the solid propellant as it is cast into a motor case of a rocket motor comprising a hollow core, a core adapter assembly, means for connecting said last said assembly to said core, a flexible slot former of circular formation having an inner framework consisting of a plurality of equally-spaced stiffening rods having a cord woven thereon and a cover of silicone rubber molded thereto, and means for detachably connecting said slot former to said core adapter assembly.

3. A slot former assembly for providing a radially-disposed slot in the solid propellant as it is cast into a motor case of a rocket motor, comprising a hollow core, a core adapter assembly, means for connecting said last assembly to said core, a flexible slot former having radial symmetry, means for detachably connecting said slot former to said core adapter assembly, said slot former being of circular formation having an inner framework and an outer covering of silicone rubber molded thereon, said framework comprising a plurality of equally-spaced stiffening rods having a cord woven thereon and said stiffening rods having angularly-disposed ends thereon whereby said ends may be grasped for removal of said stiffening rods from said covering.

* * * * *